UNITED STATES PATENT OFFICE.

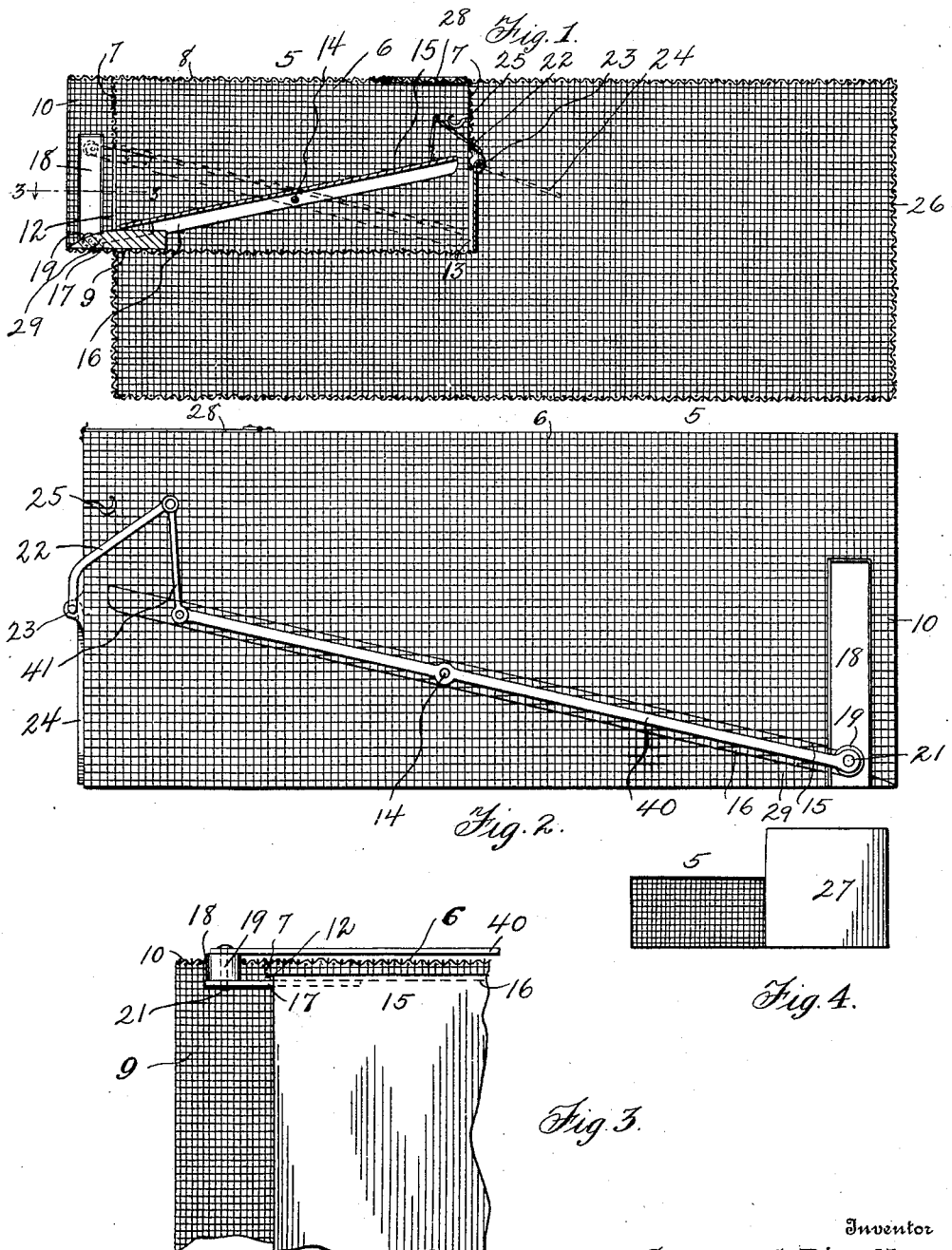

GEORGE C. BIDDLE, OF EDENBURG, PENNSYLVANIA, ASSIGNOR OF ONE-HALF TO ANDREW C. WHITE, OF NEW CASTLE, PENNSYLVANIA.

ANIMAL-TRAP.

No. 909,526.  Specification of Letters Patent.  Patented Jan. 12, 1909.

Application filed May 12, 1908. Serial No. 432,424.

*To all whom it may concern:*

Be it known that I, GEORGE C. BIDDLE, a citizen of the United States, residing at Edenburg, in the county of Lawrence and State of Pennsylvania, have invented certain new and useful Improvements in Animal-Traps, of which the following is a specification.

My invention relates to animal traps and has for its object the provision of a device of this character constructed in such manner that it will reset itself after the passage of an animal therethrough, by virtue of which construction, the trap will not be limited to the catching of one animal at a time.

The trap forming the subject matter of the present invention is particularly designed for use as a rat trap, though it may be used to trap mice.

The invention resides particularly in the mechanism located at the entrance to the trap. This mechanism may be employed with the trap body herein shown and described or it may be separately used by placing it in a wall of any character or by placing it against an ordinary box in which case said box would serve as the trap body.

Further objects and advantages of the invention will be set forth in the detailed description which now follows:

In the accompanying drawing, Figure 1 is a vertical section of an animal trap constructed in accordance with the invention. Fig. 2 is a side elevation of the entrance portion of said trap. Fig. 3 is an enlarged detailed horizontal section upon line 3—3 of Fig. 1, looking in the direction indicated by the arrow, and Fig. 4 is a detailed side elevation illustrating the manner of employing the entrance portion of the trap in conjunction with a box.

Like numerals designate corresponding parts in all of the figures of the drawing.

Referring to the drawing, the numeral 5 designates a rectangular wire casing comprising side walls 6, end walls 7, a top wall 8 and a bottom wall 9. The side walls 6 project beyond the front end wall 7 as at 10. The end walls have openings 12 and 13 formed therethrough. A shaft 14 spans the casing 5 and has pivotally mounted thereon a tilting platform 15. This platform is provided with down turned side flanges 16 which are pierced by the shaft 14 and which impart strength and rigidity to said platform. Secured to one of these flanges 16 is an arm 17 which projects through the opening 12 of the front wall of the casing. An opening 18 is formed in one of the side walls 6 and a spacing member 19 moves in said opening. A lever 40 is connected to the arm 17 by a rivet or other fastening device 21, said rivet passing through the spacing member 19, see Fig. 3. This lever 40 is mounted to rock loosely upon the projecting end of the shaft 14. A link 41 connects the inner end of this lever with the end of an arm 22. This arm is bent upwardly from a transverse shaft 23 to which is secured a door 24, said door closing the opening 13 when the parts are in the full line position illustrated in Fig. 1. A bait hook 25 is mounted upon the rear wall 7 of the casing 5. The structure so far described may be mounted in operative relation with a trap body 26 or it may be separately used and placed against a box 27.

The purpose of providing extended end walls 10 is to permit the entrance portion formed by the casing 5 to be placed against an opening in a wall and still leave sufficient space for the arm 17 and lever 40 to swing in. When thus used, this portion permits the entrance of rats into a room, such as a granary, but prevents their egress and they may then be killed either by dogs or with clubs. While I have shown the trap body as being formed of a woven wire fabric, it is to be understood that the invention is not limited in this respect, for either wood or sheet metal may be used, for this purpose. If desired, a door 28 may be provided in the top of the body portion to permit access to the bait hook for the purpose of baiting the trap, or this hook may be baited through the door 24. A filling block 29 may be used to receive the front end of the tilting platform when the trap is in its normal position, though this is not absolutely necessary. It may, however, be found desirable for the reason that a small rat might attempt to go under the tilting platform instead of over it.

The operation of the device is as follows:—The rats in endeavoring to reach the bait upon the hook 25, pass up the tilting platform until their weight overbalances it and the platform moves to the dotted line position shown in Fig. 1. This elevates the front end of the lever 20 and depresses its rear end. This depression of the rear end of the lever 40 will, through the link 21 and arm 22, rock the shaft 23 to throw the door 24 to the open position illustrated by said dotted lines. The elevation of the front end of the platform closes all avenue of escape through the opening 12, and leaves only the opening 13 visible to the rat. The rat thereupon passes through the opening 13 and into the body of the trap. As soon as the weight of the rat is removed from the tilting platform, the members return to the full line position illustrated in Fig. 1, this action being accelerated by the weight of the spacing member 19, this member being designedly a weighted one to accomplish this object.

From the foregoing description, it will be seen that simple and efficient means are herein provided for accomplishing the objects of the invention, but while the elements shown and described are well adapted to serve the purpose for which they are intended, it is to be understood that the invention is not limited to the precise construction set forth, but includes within its purview such changes as may be made within the scope of the appended claim.

Having described my invention, what I claim and desire to secure by Letters-Patent is:—

In a device of the character described, the combination with a rectangular casing comprising side walls and front and rear walls, there being openings formed through said front and rear walls, of a tilting platform mounted in said casing, a door adapted to close the opening of the rear wall, an arm connected to said door, a pivoted lever mounted upon the exterior of the casing, a link connecting said lever with said arm, the side walls of the casing being extended beyond the front wall thereof and there being an opening formed through one of said side walls, an arm connected to said platform and projecting through the opening of the front wall, and means for connecting said arm with said lever, said means projecting through the opening of the extension of one of the side walls.

In testimony whereof I affix my signature, in presence of two witnesses.

GEORGE C. BIDDLE.

Witnesses:
A. C. WHITE,
CHAS. B. MAYNE.